June 20, 1950 E. VASSY 2,512,122

DEVICE FOR COMPARING WITH A COMMON PHYSICAL RECEIVING MEANS, TWO RADIATIONS OF SIMILAR CHARACTER AND SUBSIDIARILY RECORDING THE RATIO BETWEEN SAID RADIATIONS

Filed Feb. 4, 1948 2 Sheets-Sheet 1

Inventor
E. Vassy
By
C. F. Wenderoth
Attorney

June 20, 1950 E. VASSY 2,512,122

DEVICE FOR COMPARING WITH A COMMON PHYSICAL RECEIVING MEANS, TWO RADIATIONS OF SIMILAR CHARACTER AND SUBSIDIARILY RECORDING THE RATIO BETWEEN SAID RADIATIONS

Filed Feb. 4, 1948 2 Sheets-Sheet 2

Inventor
E. Vassy
By E. F. Wenderoth
Attorney

Patented June 20, 1950 2,512,122

UNITED STATES PATENT OFFICE 2,512,122

DEVICE FOR COMPARING WITH A COMMON PHYSICAL RECEIVING MEANS, TWO RADIATIONS OF SIMILAR CHARACTER AND SUBSIDIARILY RECORDING THE RATIO BETWEEN SAID RADIATIONS

Etienne Vassy, Paris, France

Application February 4, 1948, Serial No. 6,314
In France June 8, 1944

Section 1, Public Law 690, August 8, 1946
Patent expires June 8, 1964

4 Claims. (Cl. 250—214)

An object of the present invention is to provide a device making it possible, with the use of a common physical receiving means, to compare two radiations of similar nature and subsidiarily registering the ratio between said radiations which may for example be constituted by two light beams, thermal radiations, radio radiations, etc., and wherein said physical receiver means may for instance comprise a photo-electric cell, an antenna, a thermo-pile, etc. For example in connection with beams of light, the device makes it possible inter alia to record an optical density (which may for instance be variable with time).

The basic means on which the invention is founded consists of alternately projecting at any appropriate rate of frequency, onto said common physical receiver connected to the input of an electric amplifier, both radiations to be compared and alternately and in timed synchronism with the cutting off of said radiations, blocking off two circuits mounted in parallel at the output of said amplifier, this being effected in such a way that each radiation will be received throughout similar time intervals by the common physical receiver and that the signals derived from both sources will be subjected to a similar degree of amplification in a single-path amplifier both outputs of which (each of which is assigned to the signals of a respective one of said radiations) may be made to actuate separate indicating devices, relays or suitable comparing means.

In the accompanying drawings there is diagrammatically shown, in the first place the basic means underlying this invention and in the second place an amplifier comprising a single transmission path but two separate output paths whereby said basic means may practically be carried out.

Figure 1:
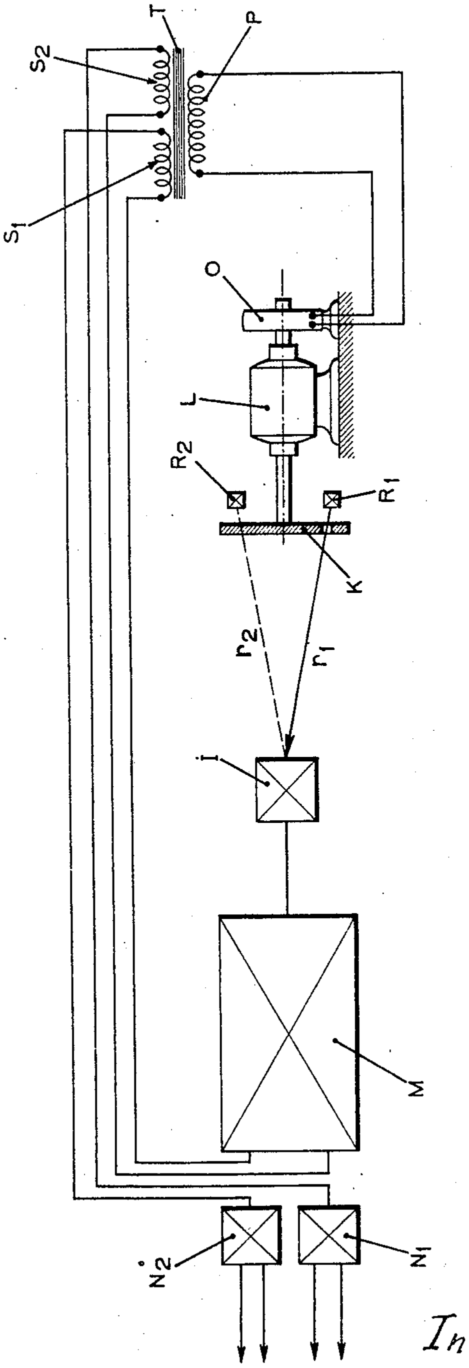
Fig. 1 is a general diagram of the basic means forming the subject matter of this invention.

As shown in Fig. 1 the radiations to be compared r1 and r2 emanating from two separate sources R1 and R2 (or from a common source) are alternately projecting onto a common physical receiver I through the use of a cut-off device which, in the event said radiations are beams of light, may be formed by a shutter device comprising for instance a perforate disk K driven from an electric motor L. The physical receiver I (e. g. a photo-electric cell) actuates a thermionic tube amplifier M having a single transmission path therethrough but whereof the output tube supplies in parallel two circuits N1 and N2, for example two amplifiers the input of which may be provided adjustable through potentiometer means in order to compensate for any unequality in the amplification through each of them.

According to the present invention, the motor L drives an alternator O which actuates (either directly or indirectly through the medium of an amplifier) the primary P of a transformer T comprising two secondaries S1 and S2 interposed between the dual output of the amplifier M and the input of each of the devices N1 and N2. The arrangement is such that each of the devices N1 and N2 is alternately blocked off under the action of the pulses supplied by the alternator O in synchronism with the alternating cut-off of the sources of radiation R1 and R2. For instance matters may be so arranged that the assembly N2 will be blocked when the radiation R2 emanating from the source R2 is shut off by a solid portion of the disk K whereas the assembly N2 on the other hand may at that moment be operating normally under the action of the radiation r1 issuing from the source of radiations R1 and passing through one of the perforations formed in the disk K, and vice versa.

The devices N1 and N2 may be made to act separately or in combination on indicating, recording, or comparing devices, or further relays, servo-motors and the like, of any description, whereby the radiations r1 and r2 may be compared and if required the ratio therebetween indicated or recorded.

Figure 2:
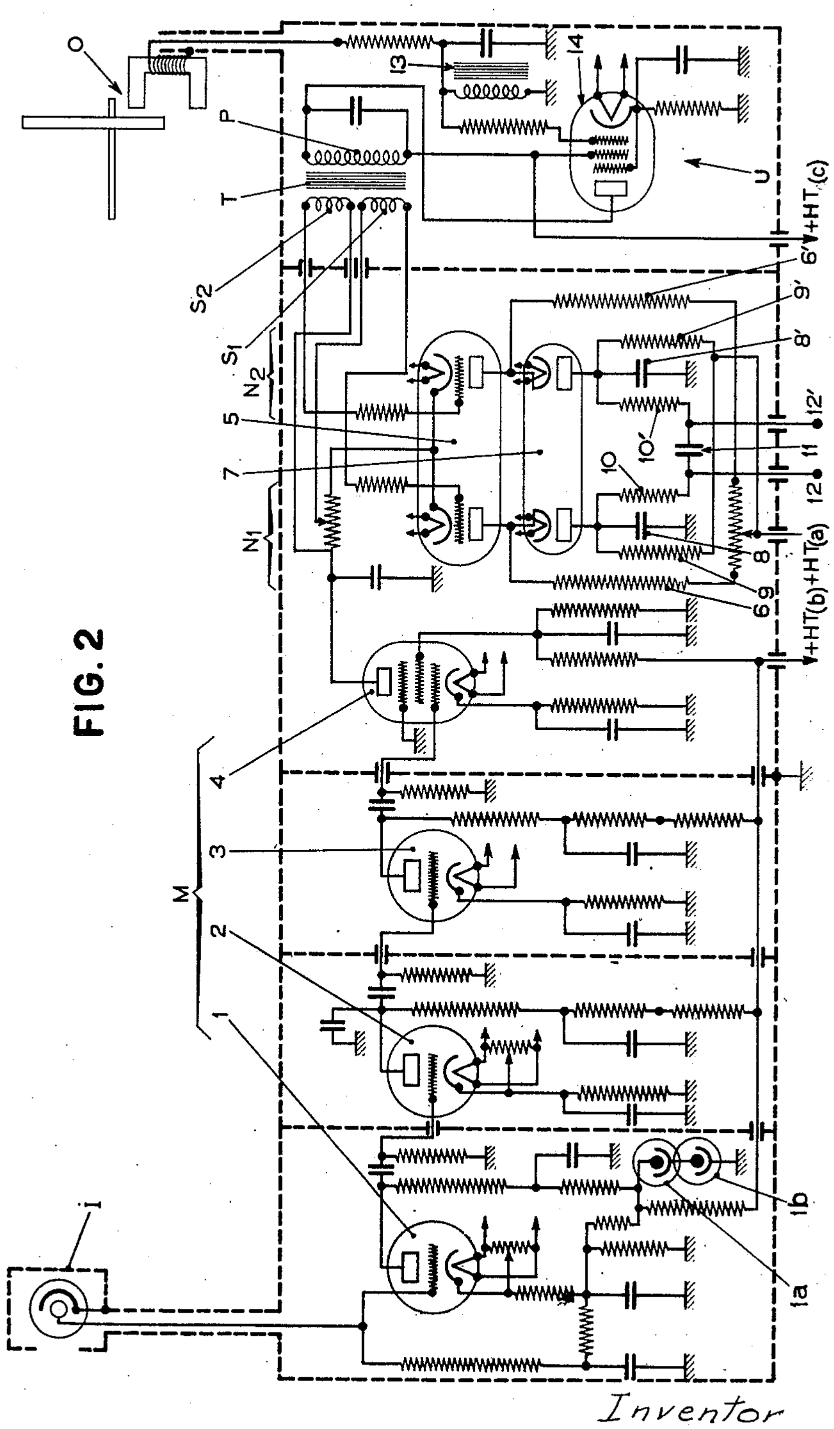
Fig. 2 is a diagram of a thermionic valve amplifier particularly suited for putting into practice the means shown in Fig. 1.

The amplifier device may for instance be designed in accordance with the diagram shown in Fig. 2, wherein it is assumed that the physical receiver I is a photo-electric cell arranged as usual in a shielded housing and the connecting leads of which are shielded all the way to the amplifier which itself is shielded.

For greater clearness in the drawing the supply sources of the amplifier have not been shown.

The single-path amplifier serving to amplify the currents supplied by the cell I (regardless of which one of the radiations is striking the cell) comprises four amplifier stages carefully shielded and loosely coupled in order to avoid the setting up of oscillations. The coupling between the various stages is of the well-known resistance-capacitance type.

The first amplifier stage is equipped with a dual diode-triode 1 (for instance a tube of the "6R7" type) only the triode portion of which is used. The amplifying gain in this stage is thus rather low but it allows a more efficient insulation of the grid connection and proper coupling between the cell and the following stage to be accomplished.

The anode of the cell I is mounted with a high load resistance, this making it possible to apply relatively high voltages to the input of the amplifier and amply dominate over the ground noise.

In order to suitably stabilize the anode voltage in the first amplifier stage which is supplied from the network, there are interposed in the anode circuit of the tube 1 two neon tubes 1*a* and 1*b* (for instance type 4687) to avoid that lesser voltage variations in the network as amplified in the following three stages should apply to the grid of the last stage tube voltages capable of momentarily rendering it inoperative.

The following two amplifier stages comprise triodes 2 and 3 (e. g. type 6R7 tubes) while the fourth stage comprises a pentode 4 having a steep characteristic (e. g. a type 6AC7 tube), in the anode circuit of which the separation between the signals alternately striking the cell I is effected. The output circuit of this last mentioned tube comprises as shown two separate paths, the amplifying operation being alternately effected through one or the other side in synchronized relationship with the signal, through the use of means to be described later.

The amplifying paths mentioned above may comprise for instance a dual triode 5 (e, g. a type 6N7 tube) wherein the anodes of the triode elements are connected through suitable resistances 6 and 6′ and a balancing potentiometer with the positive terminal of a suitable source of anode voltage.

An alternating voltage produced for instance with a small alternator O provided with a rotating iron core, which voltage is synchronized with the light cut-off effect which acts on the photoelectric cell I and which has a suitable amplitude and phase is applied through the transformer T having two secondary windings S1 and S2 as previously mentioned to the grids of the tube 5 in order to block or cut off during one half cycle period of the alternator, either one of the triode elements of said tube. It follows that only that one of the resistors 6 and 6′ which is in series with the triode element which is not triggered off, has the anode current from the pentode 4 flowing through it.

The resistors 6 and 6′ are each shunted by one of the diode elements of a dual diode tube 7 (e. g. type 6H6), the cathode of each diode being connected with the end of the corresponding resistance 6 and 6′ connected with the anode of one of the triode elements of the tube 5. The anodes of the diode elements are connected with one of the electrodes of two capacitors 8 and 8′ of appropriate capacitance, the other electrode of said capacitors being earthed. The capacitors 8 and 8′ are permanently charged through the resistances 9 and 9′ respectively from a source of anode voltage. It should be noted that the pulses applied to the grid of the tube 4 are of such polarity that they tend to increase the anode current and consequently to increase the voltage drop through that one of the resistors 6 and 6′ which is being used at the time under consideration.

The capacitors 8 and 8′ through the medium of a filter comprising resistances 10 and 10′ an a condensor 11 are connected with two terminals 12 and 12′ leading to indicating, recording or comparing devices, relays, servomotors, etc., which thus will be operated in response to the light rays striking the input cell I and which alternately issue from two separate sources.

The alternator O mentioned previously is simply comprised of a permanent magnet the pole pieces of which carry one or two windings and the reluctance variations in the magnetic circuit (and consequently the induced electromotive forces) being obtained by traversing in front of said pole pieces a soft iron disk eccentrically secured on the end of the shaft of the motor L. A buffer circuit 13 is used to filter the current supplied by the alternator O and the resulting voltage is applied to the grid of a pentode 14 (e. g. type EL3) the load circuit of which is formed by the tuned primary winding P of the transformer T.

The amplifier which has just been described above is supplied from the network, the cathodes of the separate tubes therein being supplied with crude alternating current while the anode circuits receive the various requisite voltages through a rectifier and filtering units of known types.

For greater clearness in the drawing the supply circuits for the amplifier have not been shown in Fig. 2. The above described device operates as follows:

With the apparatus in operation at a determined instant, one of the triode elements of the tube 5 is blocked or triggered off (through the assembly O, T) and the related resistance 6 or 6′ has no current flowing through it, so that both ends of the resistance are at the same potential. Because the related diode element does not supply any output, the related capacitor 8 or 8′ will be charged. During this time the other triode element of the tube 5 is in its minimum resistivity condition and the resistor 6 or 6′ connected thereto is traversed by the flow of anode current from the pentode 4, which current is a function of the voltage applied to the grid of said tube. The diode element in parallel with the resistor under consideration supplies an output and discharges the related capacitor 8′ or 8.

The time constant of each of the capacitors 8 and 8′ with the load circuit thereof is large as compared to the duration of a signal (for example said time factor may be one second as compared to the 1/120 second duration of a signal). The effect of a plurality of consecutive signals therefore cumulatively builds up on each of the capacitors 8 and 8′. If the pulses applied to the grid of the tube 4 are similar in amplitude, the capacitors 8 and 8′ will discharge in identical manner and the terminals 12 and 12′ will remain at the same potential. On the other hand if the consecutive pulses differ in amplitude, the capacitors 8 and 8′ will be discharged unequally and a difference of potential will appear between the terminals 12 and 12′. It is this voltage drop which after being slightly filtered through the resistances 10 and the condenser 11 (in order to attenuate the 120 cycle component which is superimposed thereto) which will control the indicating, recording or comparing devices, relays, servo-motors, etc. used.

It should be observed that the A.-C. voltage applied to the grids of both triode elements of the tube 5 may be the network voltage if the shutter device which distributes the light rays to the cell C is positively driven from a synchronous type of motor. In the opposite case, a current of a frequency similar to that of the signals is produced as described above by a small alternator having a rotating iron core O mounted at the end of the shaft of the shutter member K driven from the motor L (Fig. 1).

It is obvious in another respect that the tube 5 and 7 rather than being dual tubes may each be replaced by two separate tubes. Thus, the dual triode element tube 5 may be replaced by two separate triodes or two separate pentodes and the like.

The exemplary embodiment of the device as described above and diagrammatically illustrated in the accompanying drawings has of course been given for purposes merely of illustration and not of limitation and the device may receive any modifications in detail without the spirit of the invention being departed from.

What I claim is:

1. In a device of the type described, in combination, a single receiver adapted to be struck by a pair of separate beams of radiations to be compared, a rotary obturating means adapted when rotated to cut off each of said beams from said single receiver in alternating sequence, a single path electronic amplifier including an output electronic tube, said amplifier being fed from said receiver, a pair of triode electronic tubes having the grid circuits thereof supplied in parallel by the anode circuit of said output tube, means synchronized with said rotary member for alternately biasing said triodes to cut-off in synchronism with the cutting off of said beams, a high voltage source supplying said triodes, a pair of load resistances and a potentiometric gain-balancing means inserted between said high voltage source and the anodes of said triodes, a pair of diode tubes across each of said load resistances respectively, each having its cathode connected to the anode of the respective one of said triode, a pair of condensers having a first electrode thereof connected to the anode of a corresponding one of said diode and the other electrode thereof grounded, an indicating device connected to said first condenser electrodes, and resistance-capacitance filter means inserted between said first condenser electrodes and said indicating device, whereby a voltage drop appears between the terminals of said indicating device whenever the amplified pulses from said electronic amplifier differ in amplitude due to a difference in the respective amplitudes of both said beams of radiations.

2. A device as in claim 1, wherein said condensers are selected with a time constant which is large as compared with the durations of each of said pulses as determined by the rate of said obturator cut-off frequency.

3. A device as in claim 1, wherein in each of the elements of said pair of triodes forms part of a dual triode tube.

4. A device as in claim 1, wherein each of the elements of said pair of diodes forms part of a dual diode tube.

ETIENNE VASSY.

REFERENCES CITED

The following references are of record in the file of this patent:

UNITED STATES PATENTS

| Number | Name | Date |
|---|---|---|
| 1,867,398 | Cockrell | July 12, 1932 |
| 1,963,185 | Wilson | June 19, 1934 |
| 1,971,317 | Sheldon | Aug. 21, 1934 |
| 2,066,934 | Gulliksen | Jan. 5, 1937 |
| 2,080,081 | Loth et al. | May 11, 1937 |
| 2,251,613 | Kott | Aug. 5, 1941 |
| 2,264,725 | Shoupp et al. | Dec. 2, 1941 |